United States Patent
Zimmermann et al.

(10) Patent No.: US 8,205,008 B2
(45) Date of Patent: Jun. 19, 2012

(54) ONLINE RESOURCE SERVER FOR ALLOWING DEVICE CONTROL AND ACCESS TO DIGITAL CONTENT THROUGH PLUGGABLE USER INTERFACES

(76) Inventors: Gottfried Zimmermann, Pfullingen (DE); Ishak Kang, El Cerrito, CA (US); Parikshit Thakur, Stafford, TX (US)

( * ) Notice: Subject to any disclaimer, the term of this patent is extended or adjusted under 35 U.S.C. 154(b) by 47 days.

(21) Appl. No.: 12/357,248

(22) Filed: Jan. 21, 2009

(65) Prior Publication Data
US 2009/0259738 A1     Oct. 15, 2009

Related U.S. Application Data

(60) Provisional application No. 61/022,409, filed on Jan. 21, 2008.

(51) Int. Cl.
| | |
|---|---|
| G06F 15/16 | (2006.01) |
| G06F 15/173 | (2006.01) |
| G06F 11/00 | (2006.01) |
| G06F 3/041 | (2006.01) |
| G06F 3/00 | (2006.01) |
| G06F 3/048 | (2006.01) |
| H04B 7/212 | (2006.01) |
| H04W 4/00 | (2009.01) |
| G09G 5/00 | (2006.01) |
| H05K 7/10 | (2006.01) |

(52) U.S. Cl. ........ 709/237; 709/201; 709/218; 709/223; 709/228; 345/156; 345/173; 370/235; 370/337; 370/338; 370/352; 370/468; 710/15; 710/301; 715/810; 715/835

(58) Field of Classification Search .......... 345/156, 345/173; 370/235, 337, 338, 352, 468; 709/201, 709/218, 223, 229, 237; 710/15, 301; 715/810, 715/835
See application file for complete search history.

(56) References Cited

U.S. PATENT DOCUMENTS
6,006,332 A    12/1999    Rabne
(Continued)

FOREIGN PATENT DOCUMENTS
EP     1 372 238     12/2003

OTHER PUBLICATIONS

Zimmermann, Gottfried et al., "The Universal Control Hub: An Open Platform for Remote User Interfaces in the Digital Home", Lecture Notes in Computer Science, vol. 4551/2007, pp. 1040-1049, ISBN 978-3-540-73106-1, 2007.

(Continued)

*Primary Examiner* — Ario Etienne
*Assistant Examiner* — Ho Shiu
(74) *Attorney, Agent, or Firm* — Fliesler Meyer LLP

(57) ABSTRACT

An online resource server for allowing device control and access to digital content through pluggable user interfaces (PUI). Features of various embodiments of the system can also include: a system of access rights for resources; user types and their meaning; determination of mandatory and optional properties of resources; an algorithm for ranking of resources based on weights given in a resource query; registration of a PUI upon upload resulting in a unique resource name (URI); user interface socket descriptions for device classes, and extensibility of the socket descriptions through naming conventions; a universal Control Hub as a Service; an ability to allow content owners to protect their intellectual property by keeping the (protected) media over HDMI separated from the control network; an ability to track usage data and dynamically adjust the PUI without the need for user intervention; and enhanced technical support, including remote diagnostics of the consumer electronics equipment.

18 Claims, 4 Drawing Sheets

U.S. PATENT DOCUMENTS

| | | | |
|---|---|---|---|
| 6,175,363 B1 | 1/2001 | Williams | |
| 6,188,401 B1 | 2/2001 | Pleyer | |
| 6,658,400 B2 | 12/2003 | Perell | |
| 6,904,485 B1* | 6/2005 | Quinton | 710/301 |
| 6,952,836 B1 | 10/2005 | Donlan | |
| 6,990,655 B2 | 1/2006 | Abdelhadi | |
| 7,206,824 B2 | 4/2007 | Somashekar | |
| 2003/0046557 A1* | 3/2003 | Miller et al. | 713/186 |
| 2003/0088570 A1* | 5/2003 | Hilbert et al. | 707/100 |
| 2003/0103088 A1* | 6/2003 | Dresti et al. | 345/835 |
| 2005/0246468 A1* | 11/2005 | Quinton | 710/301 |
| 2006/0085852 A1 | 4/2006 | Sima | |
| 2006/0161865 A1* | 7/2006 | Scott et al. | 715/810 |
| 2007/0006144 A1* | 1/2007 | Tsai et al. | 717/113 |
| 2007/0038599 A1 | 2/2007 | Pearson | |
| 2007/0055390 A1 | 3/2007 | Simon | |
| 2007/0260880 A1* | 11/2007 | Satterlee et al. | 713/164 |
| 2007/0279244 A1* | 12/2007 | Haughawout et al. | 340/825.22 |
| 2008/0005302 A1 | 1/2008 | Speicher | |
| 2008/0098058 A1* | 4/2008 | Shih et al. | 709/201 |
| 2008/0126591 A1* | 5/2008 | Kwon | 710/15 |
| 2008/0175207 A1* | 7/2008 | Lee et al. | 370/337 |
| 2008/0288618 A1* | 11/2008 | Vardi et al. | 709/223 |
| 2009/0013366 A1* | 1/2009 | You et al. | 725/118 |
| 2010/0066906 A1* | 3/2010 | Nakajima | 348/500 |

OTHER PUBLICATIONS

Zimmermann, Gottfried et al., "Universal Control Hub & Task-Based User Interfaces", http://myurc.org/publications/2006-Univ-Ctrl-Hub.php, Jan. 2006.

PCT International Search Report dated Jun. 18, 2009 in connection with PCT Application No. PCT/US2009/031610.

Zimmermann, G. et al., Aug. 2007, "The Universal Control Hub: An Open Platform for Remote User Interfaces in the Digital Home," In: Springer LNCS, vol. 4551/2007, Human-Computer Interaction, Interaction Platforms and Techniques, pp. 1040-1049, ISSN: 0302-9743 (Print) 1611-3349 (Online), DOI: 10.1007/978-3-540-73107-8, ISBN: 978-3-540-73106-1, Springer Berlin / Heidelberg, 2007.

Jacko et al., "Human-Computer Interaction Interaction Platforms and Techniques" 12th International Conference, HCI International 2007 Beijing, China, Jul. 2007 Proceedings, Part II, Springer Berlin / Heidelberg, 2007.

Berners-Lee et al., "RFC 3986: Uniform Resource Identifier (URI): Generic Syntax," Jan. 2005.

Zimmermann, G., "Resource Property Vocabulary 1.0 (DRAFT) Draft Technical Report," Aug. 14, 2008.

Zimmermann, G., "Resource Property Vocabulary 1.0 (DRAFT) Draft Technical Report," Nov. 24, 2008.

Zimmermann, G., "Resource Server HTTP Interface 1.0 (DRAFT) Draft Technical Report," Aug. 14, 2008.

Joseph, et al., CEA Announces New Home Networking Standard, Remote User Interface for the Digital Home, "CEA-2014 Web-based Protocol and Framework for Remote User Interface on UPnP(tm) Networks and the Internet", Aug. 10, 2006, Arlington, VA, 2 pages.

Unknown, Final Draft—International Standard, "Information Technology—User Interfaces—Universal Remote Console—Part 1: Framework", Reference No. ISO/IEC FDIS 24752-1:2007(E), 2007, 66 pages.

Unknown, Final Draft—International Standard, "Information Technology—User Interfaces—Universal Remote Console—Part 2: User Interface Socket Description", Reference No. ISO/IEC FDIS 24752-2:2007(E), 2007, 60 pages.

Unknown, Final Draft—International Standard, "Information Technology—User Interfaces—Universal Remote Console—Part 3: Presentation Template", Reference No. ISO/IEC FDIS 24752-3:2007(E), 2007, 26 pages.

Unknown, Final Draft—International Standard, "Information Technology—User Interfaces—Universal Remote Console—Part 4: Target Description", Reference No. ISO/IEC FDIS 24752-4:2007(E), 2007, 22 pages.

Unknown, Final Draft—International Standard, "Information Technology—User Interfaces—Universal Remote Console—Part 5: Resource Description", Reference No. ISO/IEC FDIS 24752-5:2007(E), 2007, 58 pages.

Universal Plug and Play, http://en.wikipedia.org/wiki/Universal_Plug_and_Play, Dec. 22, 2008, 8 pages.

Office Action in connection with U.S. Appl. No. 12/646,486 dated Apr. 20, 2012, 10 pages.

* cited by examiner

US 8,205,008 B2

ONLINE RESOURCE SERVER FOR ALLOWING DEVICE CONTROL AND ACCESS TO DIGITAL CONTENT THROUGH PLUGGABLE USER INTERFACES

CLAIM OF PRIORITY

This application claims the benefit of priority to U.S. Provisional Patent Application No. 61/022,409 entitled "ONLINE RESOURCE SERVER FOR ALLOWING DEVICE CONTROL AND ACCESS TO DIGITAL CONTENT THROUGH PLUGGABLE USER INTERFACES", inventors Gottfried Zimmermann et al., filed Jan. 21, 2008; which application is herein incorporated by reference.

This invention was made with government support under funding agreement number H133E030012 awarded by the Department of Education. The government has certain rights in the invention.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to remote control of devices, including entertainment devices such as music, television, multimedia, and digital content devices, and is particularly related to an online resource server for allowing device control and access to digital content through pluggable user interfaces.

BACKGROUND

Users of music, television, multimedia, digital content, and other devices have become increasingly frustrated with an ecosystem that consists of too many components. In the world of entertainment, these consumers may connect devices such as DVD players, set-top boxes, amplifiers, remote controls, and television displays through a myriad of cables and wireless technologies that all need to be customized and programmed in order to function. The confusion faced by consumers is compounded when other, more critical, home systems are factored into the ecosystem, such as lighting, temperature, security and health monitoring controls. There have been some industry efforts to standardize the technical functionality of electronic equipment, for example, the development of Universal Plug and Play (UPnP). However, other technologies and specifications, such as those related to Audio/Video, are extremely verbose. As a consequence, manufacturers have generally implemented only parts of these specifications, which in turn creates functionality holes for the ecosystem. Ultimately, this makes it extremely difficult to create a user interface to operate such an ecosystem. These are some of the areas that embodiments of the present invention are designed to address.

SUMMARY

Disclosed herein is an online resource server for allowing device control and access to digital content through pluggable user interfaces (PUI). In accordance with an embodiment, the system disclosed herein makes networked consumer electronics significantly easier to use for the consumer. In accordance with an embodiment, a Resource Server is provided to match an individual with a PUI that they can use as their personal interface. Features of various embodiments of the system can also include: a system of access rights for resources; user types and their meaning; determination of mandatory and optional properties of resources; an algorithm for ranking of resources based on weights given in a resource query; registration of a PUI upon upload resulting in a unique resource name (URI); user interface socket descriptions for device classes, and extensibility of the socket descriptions through naming conventions; a universal Control Hub as a Service; an ability to allow content owners to protect their intellectual property by keeping the (protected) media over HDMI separated from the control network; an ability to track usage data and dynamically adjust the PUI without the need for user intervention; and enhanced technical support, including remote diagnostics of the consumer electronics equipment. Additional features and advantages will be evident from the following description.

DETAILED DESCRIPTION

Figure 1:
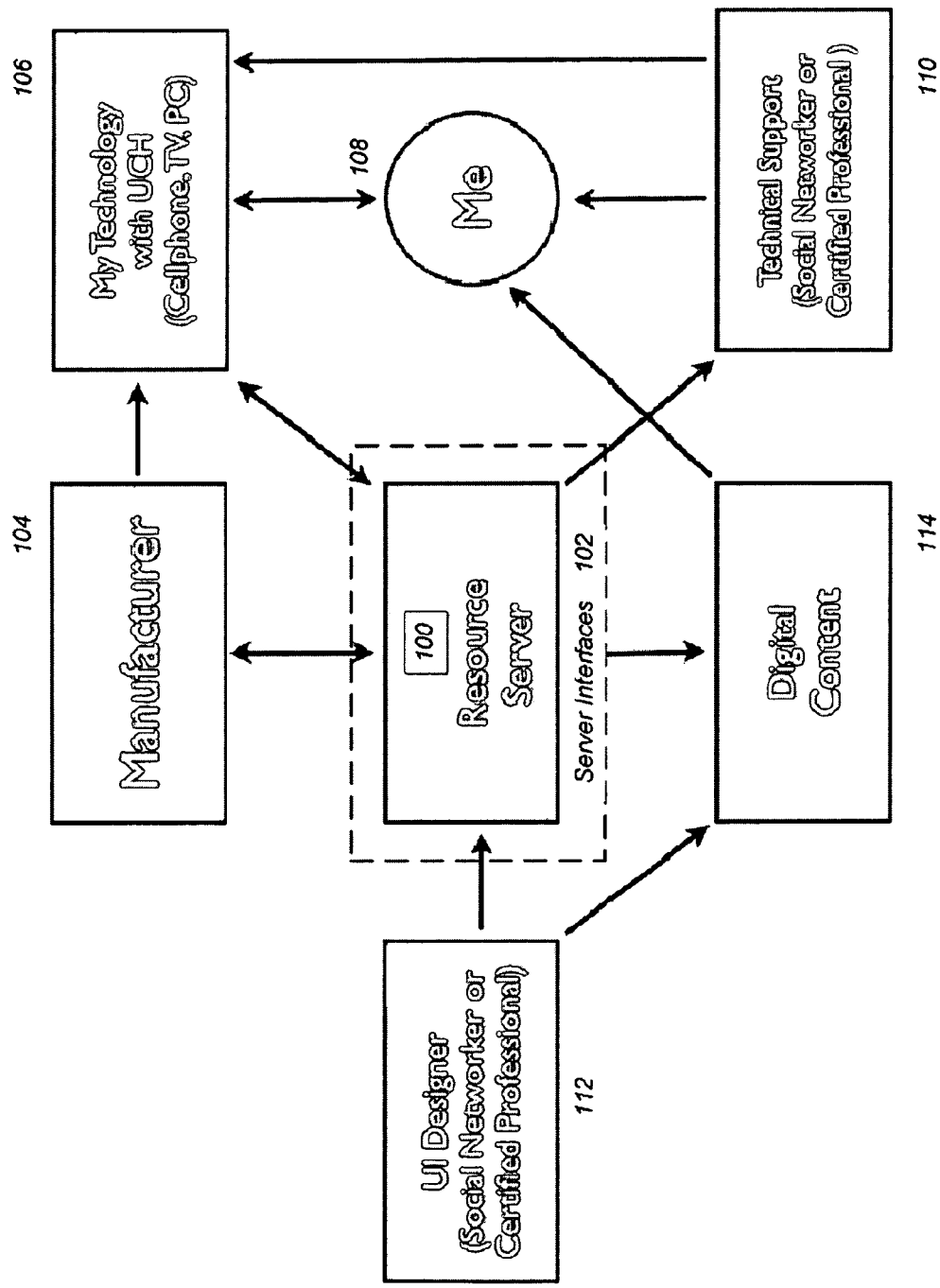
FIG. 1 shows an illustration of an ecosystem in accordance with an embodiment of the invention.

Disclosed herein is a system and method for providing Pluggable User Interfaces (PUI), Universal Control Hubs (UCH) and an online Resource Server (RS). As described above, while there have been some industry efforts to standardize the technical functionality of electronic equipment, manufacturers have generally implemented only parts of these specifications, which in turn creates functionality holes for the ecosystem.

In accordance with an embodiment, a Resource Server is provided to match an individual with a PUI that they can use as their personal interface. Features of various embodiments of the system can also include: a system of access rights for resources; user types and their meaning; determination of mandatory and optional properties of resources; an algorithm for ranking of resources based on weights given in a resource query; registration of a PUI upon upload resulting in a unique resource name (URI); user interface socket descriptions for device classes, and extensibility of the socket descriptions through naming conventions; a universal Control Hub as a Service; an ability to allow content owners to protect their intellectual property by keeping the (protected) media over HDMI separated from the control network; an ability to track usage data and dynamically adjust the PUI without the need for user intervention; and enhanced technical support, including remote diagnostics of the consumer electronics equipment.

The PUI (also known as the "User Interface Implementation Description") has been published by the ANSI in their 389-2005 through 393-2005 standards, and, more recently, through the ISO/IEC 24752:2008 standard, each of which standard specifications are herein incorporated by reference. These standards, and the UCH (a specific profile of the standards), have been promoted by the Universal Remote Console Consortium (URCC), particularly through use of its Software and Development Kit. Additional documents that describe work in this area include U.S. Pat. Nos. 6,952,836; 6,188,401; 6,990,655; 7,206,824; 6,006,332; 6,175,363; 6,658,400; and Specifications ISO/IEC 24752:2008 Universal Remote Console (5 parts); Universal Control Hub & Task-Based User Interfaces, January 2006; CEA-2014-A, Web-based Protocol and Framework for Remote User Interface on UPnP Networks and the Internet (Web4CE), April 2007; and IETF RFC 3986, Uniform Resource Identifier (URI): Generic Syntax, January 2005; and RFC 4122; each of which are also herein incorporated by reference.

To enable an open platform for user interfaces, the standards require a market place for pluggable user interfaces and other user interface resources. In accordance with an embodiment of the present invention, systems and methods are disclosed that provide an implementation of a Resource Server that can be used with such a market place. The Resource Server in turn provides added value to all stakeholders, i.e. users, manufacturers of controlled devices, authors of pluggable user interfaces, and any third parties involved (e.g. technical support providers).

FIG. 1 shows an illustration of an ecosystem in accordance with an embodiment of the invention. In accordance with an embodiment, the user interface resources in the ecosystem can be contributed by the manufacturer of the controlled devices, by the manufacturer of the controllers, by the user, or by any third party. Traditional methods have been fragmented and device-specific. The proposed system recognizes that people (users, customers, etc.) should not have to focus on how their devices are configured, or which buttons on which device to press; but rather should be allowed to focus on what task they intend to accomplish. Traditionally, the user could hire a professional expert to sell, install, and program their equipment, but it is prohibitively expensive for most people to do this.

In accordance with an embodiment, the Resource Server is configured to match an individual with a PUI that they can use as their personal interface. This can be accomplished by using a combination of one or more of the following features, which are also described in further detail below:

1. A system of access rights for resources: read, write, query and retrieval flags for owners, groups, others.

2. User types and their meaning: query restricted, user restricted, group restricted, not restricted, admin.

3. Determination of mandatory and optional properties of resources based on MIME type (or some equivalent resource property specifying its type).

4. An algorithm for ranking of resources based on weights given in a resource query.

5. Registration of a PUI upon upload resulting in a unique resource name (URI), for example as a Digital Object Identifier (DOI) type URI. Alternatively, the provider of a pluggable user interface may assign any resource URI as a global identifier for the PUI.

6. User interface socket descriptions for device classes, and extensibility of the socket descriptions through naming conventions.

7. The ability to provide the Universal Control Hub as a Service.

8. The ability to allow content owners to protect their intellectual property by keeping the (protected) media over HDMI separated from the control network, as a method to blend Digital Rights Management (DRM) with control interoperability.

9. The Resource Server tracks usage data and can dynamically adjust the PUI without the need for user intervention.

10. Technical support (including remote diagnostics) of the consumer electronics equipment can be facilitated by usage parameters known by the UCH, such as the user interface socket name (URI), the names (URI) of involved PUIs and other resources, and the names (URIs) of the target devices connected to the UCH.

As shown in FIG. 1, in accordance with an embodiment, the Resource Server 100 can be implemented on one or more general purpose or specialized digital computers or microprocessors. The Resource Server provides one or more interfaces 102 by which a variety of entities can communicate with the resource server. A Manufacturer 104 can embed URC technology either in a controller device (for example, into their cell phone or mobile device, their television, or large display), or in any other device 106 connected to the home network (for example, a set-top box or a networked attached storage device) of an end User 108. Device manufacturers are interested in building brand loyalty and a positive customer experience. In accordance with an embodiment, using the Resource Server, the system can report real-time usage statistics to the manufacturers or other parties in the value chain. For example, if the user is experiencing difficulty with their URC-enabled product, then diagnostic data can be captured by the Resource Server with the user's permission. With this collected data, service providers 110 can assist the customer in resolving the problem in real-time. A payment model can also be employed that allows the transaction to take place without the need for a previously established customer relationship between user and service providers. User Interface Designers 112 can also provide digital content 114 to an end User via the Resource Server.

Access Rights

In accordance with an embodiment, each resource has at least one owner. The set of owners includes the creator of the resource. A resource can have one or multiple user groups assigned, wherein a group is a non-hierarchical set of users. In accordance with an embodiment, an access rights system similar to the Unix file access rights system is used, in that a resource has three sets, each with four Boolean flags, that are used to identify its access rights:

u-set: specifies the rights of the resource's owners.
    g-set: specifies the rights of the resource's groups.
    o-set: specifies the rights of all other users, including guests.

In accordance with an embodiment, each set consists of the following 3 flags:

| r = read | W = write | q = query | v = retrieve |
|---|---|---|---|
| user can discover and read the resource through resource editing interface | user can write/modify the resource and its properties through resource editing interface | user can discover the resource's properties through the resource server's query interface | user can retrieve the resource through the resource server's retrieval interface |

Altogether, the access rights are coded as 'rwqv rwqv rwqv' (with r, w, q and v being Boolean values). In accordance with an embodiment, the default value for a resource is '1111 1111 1011': full access for owners and group members, and read/query/retrieve rights for anybody else.

In accordance with an embodiment, a means of providing conflict resolution can be used. If a resource's read, write, query, or retrieve right conflict between its u-set, g-set or o-set, then the conflict can be resolved as follows:

1. If the user is an owner of the resource, the rights as specified in the u-set shall be authoritative.

2. Otherwise, if the user is a member of one of the resource's groups, the rights as specified in the g-set shall be authoritative.

3. Otherwise, the rights as specified in the o-set shall be authoritative.

The above method of conflict resolution may exempt resource owners or group members from access rights that would be otherwise granted.

User Types

In accordance with an embodiment, a variety of user types can be used. In accordance with other embodiments, other user types may be provided:

| User type | Access rights for http-based query/retrieval | Access rights for resource editing Web interface | Access rights for administration Web interface (properties, descriptors groups and users) | Default settings for a resource (when user creates a new resources) |
|---|---|---|---|---|
| Query restricted | User can query and retrieve those resources that grant the query/retrieve right (q/v flag) through ownership (u-set), group membership (g-set) or guesttatus (o-set). | No access. | No access. | n/a (user cannot create a new resource) |
| User restricted | Same as for "query restricted" | For resources that the user has read access to through ownership: User can find/read resources. For resources that the user has write access to through ownership: User can edit/remove resources. User can release his ownership of a resource, but not change ownership in any other way. User can change group assignment for groups he belongs to. User can edit access rights of a resource for the u-set, and read and write access for the g-set only. Note: He can grant read/write access to his group(s) because that allows a "user restricted" user to create a resource, and a "group restricted" user of the same group to promote this resource to be a retrievable resource to the group. | No access. | User is owner No groups assigned Access rights: 1111-1100-0000 (user-group-others) |
| Group restricted | Same as for "query restricted" | For resources that the user has read access to through ownership or group membership: User can find/read resources. For resources that the user has write access to through ownership or group membership: User can edit/remove resources. User can change ownership of a resource, but only for members of his group(s). User can change group assignments of a resource, but only for his group(s). User can edit access rights of a resource for u-set and g-set only. | No access. | User is owner The user's groups assigned Access rights: 1111-1111-0000 (user-group-others) |
| Not restricted | Same as for "query restricted" | For resources that the user has read access to through ownership, group membership or guest status: User can discover/read resources. For resources that the user has write access to through ownership, group membership or guest status: | No access. | User is owner The user's groups assigned Access rights: 1111-1111-1011 (user-group-others) |

| User type | Access rights for http-based query/retrieval | Access rights for resource editing Web interface | Access rights for administration Web interface (properties, descriptors groups and users) | Default settings for a resource (when user creates a new resources) |
|---|---|---|---|---|
| Admin (super user) | User can query/retrieve all resources (independent of a resource's access rights). | User can edit/remove resources. User can change ownership of a resource for all users. User can change group assignments of a resource for all groups. User can edit all access rights of a resource. User can read, write and edit access rights for all resources (independent of a resource's access rights). | Full access. | User is owner The user's groups assigned Access rights: 1111-1111-1011 (user-group-others) |

Mandatory and Optional Resource Properties

In accordance with an embodiment, a resource can have any type of property, and may have multiple instances of the same property (with different values). In accordance with an embodiment, the "name" property is mandatory for a resource. The "name" property references the global identifier of a resource. The dc:format property determines the MIME type of a resource, and is a mandatory property for a second resource. Depending on its MIME type, the resource has a set of mandatory and optional properties. This is to be specified for each MIME type, by the resource server administration.

The set of (mandatory and optional) properties is useful to know when querying the resource server for a specific resource of a given MIME type. Instead of MIME type, a different property (or set of properties) can be used as the "differentiating property". If problems occur with MIME type registration with IANA, then vendor-specific MIME types can be used.

The following table provides an initial set of mandatory and optional properties defined for those MIME types referenced by ISO/IEC 24752. The property dc:format (MIME type) itself is mandatory for every resource. In accordance with other embodiments, other property types may be provided:

| MIME type | Mandatory properties of a resource | Optional properties of a resource |
|---|---|---|
| application/urc-uisocketdesc+xml | name<br>dc:format<br>dct:conformsTo<br>dct:modified | dc:description<br>dc:creator<br>dc:contributor<br>dc:publisher<br>dc:title<br>other properties (extensible) |
| application/urc-pret+xml | name<br>dc:format<br>dct:conformsTo<br>uiidForDomain<br>dct:modified | dc:description<br>dc:creator<br>dc:contributor<br>dc:publisher<br>dc:title<br>other properties (extensible) |
| application/urc-targetdesc+xml | name<br>dc:format<br>dct:conformsTo<br>dct:modified | dc:description<br>dc:creator<br>dc:contributor<br>dc:publisher<br>dc:title<br>categoryTaxonomyName<br>categoryCode<br>upnp:deviceType<br>upnp:manufacturer<br>upnp:manufacturerURL<br>upnp:modelName<br>upnp:modelNumber<br>upnp:modelURL<br>upnp:serialNumber<br>upnp:UDN<br>upnp:UPC<br>other properties (extensible) |

-continued

| MIME type | Mandatory properties of a resource | Optional properties of a resource |
| --- | --- | --- |
| application/urc-ressheet+xml | name<br>dc:format<br>dct:conformsTo<br>dct:modified | dc:description<br>dc:type<br>forLang<br>aResDescForDomain<br>role<br>groupingForDomain<br>other properties (extensible) |
| application/urc-resdir+xml | name<br>dc:format<br>dct:conformsTo<br>dct:modified | dc:description<br>dc:type<br>forLang<br>aResDescForDomain<br>role<br>groupingForDomain<br>uiidForDomain<br>other properties (extensible) |

The sets of mandatory and optional properties for other MIME types may be specified by the system administrator, or the administrator of a Resource Server.

Property Weighting Algorithm

Figure 2:
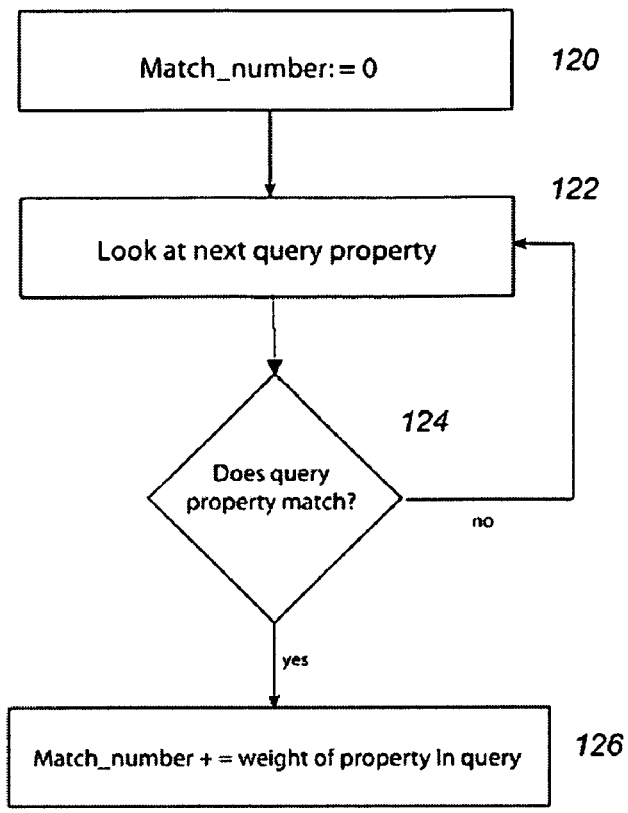
FIG. 2 shows a property weighting algorithm or method in accordance with an embodiment of the invention.

In accordance with an embodiment, the system can use a property weighting algorithm. FIG. 2 shows a property weighting algorithm or method in accordance with an embodiment of the invention. As shown in FIG. 2, the list of resources returned for a resource query is sorted by descending match numbers. The match number of a resource under consideration is computed as follows:

1. In step 120, the match number is 0 initially.
2. In step 122, the system looks at the next query property and, in step 124, determines if the query property is a match.
3. In step 126, for every property included in the query that matches the resource, the system adds the weight of the property as indicated in the query.
4. For an efficient resource query processing, a query can be translated into a series of database queries (SQL queries). A threshold can be dynamically adjusted to serve as a stop criterion for following the database queries.

In accordance with other embodiments, variations and refinements of the above algorithm and method can be provided.

Resource Retrieval URL

In accordance with an embodiment, a resource can be accessed using a uniform resource locator (URL) and the hypertext transfer protocol (HTTP). The URL for retrieval of a resource may be in the Resource Server domain, or from a foreign domain. For resources being served from the Resource Server, the following syntax is used:

http://socket24.com/retrieve?name=resourceName

With resourceName being the global identifier URI (name) of the resource requested. Coding restriction for resourceName apply. Percent-encoding can be used as specified by RFC 3986. As a service to PUI providers, the PUI can be registered under the Digital Object Identifier (DOI) scheme, or in the UUID URN namespace, as defined in RFC 4122, upon upload. Alternatively, the provider can assign any URI as global identifier. If the provider assigns a URI, then it is their responsibility to make sure it is actually globally unique.

Socket Descriptions and Specialization

Figure 3:
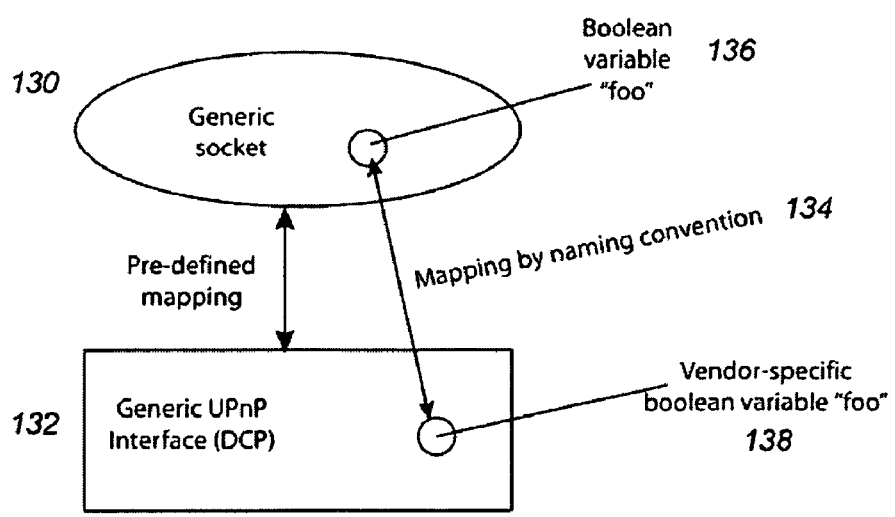
FIG. 3 shows a socket description in accordance with an embodiment of the invention.

In accordance with an embodiment, the system can use sockets for devices. FIG. 3 shows a socket description in accordance with an embodiment of the invention. As shown in FIG. 3, the system is used to assign a basic socket description for a set of devices (e.g. UPnP/DLNA device class). A generic target adapter or interface 132 is available from the resource server via a generic socket 130 and a pre-defined mapping. This generic target adapter is extensible in case vendors implement device-specific elements (possible in UPnP). In this case, an extended target adapter is generated on the fly by the resource server, based on mapping by naming conventions 134. For example, if the UPnP service received a vendor-specific extension of a boolean variable named "foo", then the system can provide an additional boolean socket element named "foo" 136, that maps to the vendor-specific UPnP variable "foo" 138. In this manner there will always be a generic target adapter available for known UPnP/DLNA device classes, without inhibiting extensibility of those classes. If vendors want to make more complex extensions to their devices, they can publish their own user interface socket for them.

Universal Control Hub as a Service

Figure 4:
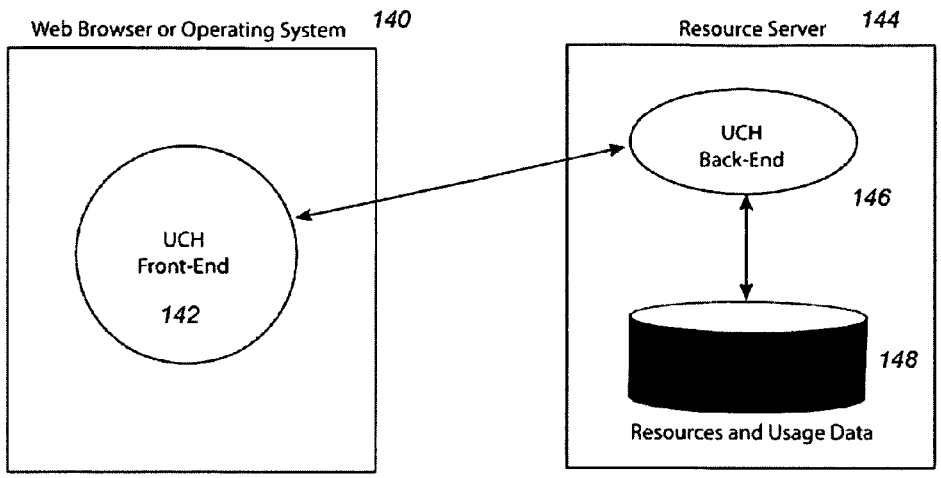
FIG. 4 shows a Universal Control Hub being used as a service in accordance with an embodiment of the invention.

In accordance with an embodiment, the system can use a universal control hub as a service. FIG. 4 shows a Universal Control Hub being used as a service in accordance with an embodiment of the invention. In accordance with an embodiment, the Universal Control Hub can be implemented in two parts:

A thin front-end 142, running as a Web client or in a browser window 140 (for example, as a technical implementation through Web API, or applet, or Widget, or some form of JavaScript code). Alternatively the client can run on an NAS device, or set-top-box, but without the optional run-time environment for controller user interfaces. The front-end is responsible for:

downloading (and caching) target discovery modules and target adapter modules from the resource server, based on the client's local environment;

downloading (and caching) user interface socket descriptions, pluggable user interfaces, atomic and other resources from the resource server, as needed;

providing a run-time environment for user interface sockets, connecting existing controllers and targets, as occurring in the client's local environment;

downloading (and caching) user interface protocol modules from the resource server, based on the available targets and controllers used in the client's local environment;

sending usage and trouble-shooting data to the resource server (this feature can be switched on and off by the user); and optionally providing the run-time environment for controller user interfaces of specific types (for example, HTML with JavaScript, Flash, which is easily achieved if running inside a Web browser.

A back-end 146 on the resource server 144, supporting the front-end with everything else that is needed for a fully operational universal control hub plus resource server, which accommodates in a resources and usage database 148 both the access rights system for the resources and the user type system for the resource server. The back-end is responsible for:

provision of target discovery modules and target adapters for download;

provision of user interface socket descriptions, pluggable user interfaces, atomic and other resources for download;

provision of user interface protocol modules for download; and reception, storage and utilization of usage and troubleshooting data.

Separation of Device Control from DRM-Protected Media for HDMI Connections

Figure 5:
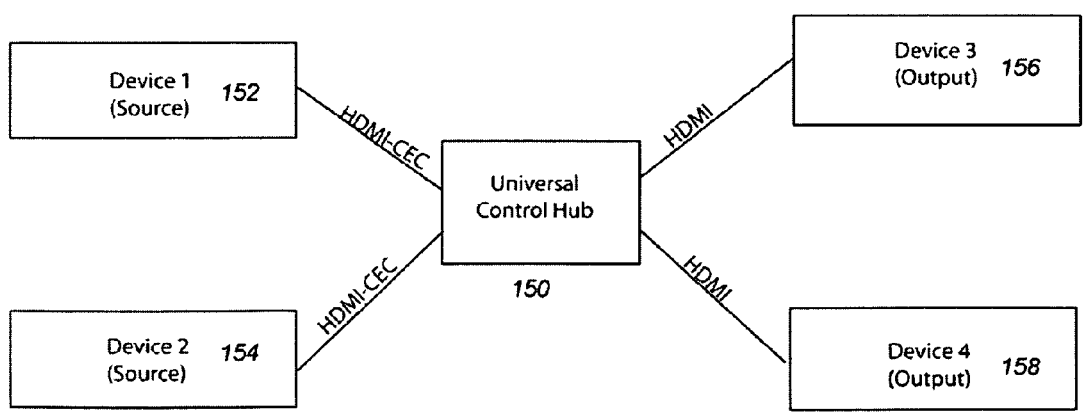
FIG. 5 shows a separation of device control from DRM-protected media in accordance with an embodiment of the invention.

In accordance with an embodiment, the system allows for separating device control. FIG. 5 shows a separation of device control from DRM-protected media in accordance with an embodiment of the invention. As shown in FIG. 5, in accordance with an embodiment, the universal control hub 150 provides communication between HDMI-CEC enabled devices 152, 154 and non HDMI-CEC enabled devices 156, 158. The UCH separates the control-specific aspects (HDMI-CEC channel) from the content protection aspects (covered by other HDMI channels). Based on this approach, the UCH coordinates the "control-specific" aspects of HDMI. This embodiment can be used to provide greater protection for the device manufacturer from such acts as copyright infringement. It also allows for greater control between an HDMI-CEC enabled device to a non-HDMI-CEC-enabled device.

Tracking of Usage Data for Technical Support Purposes

Figure 6:
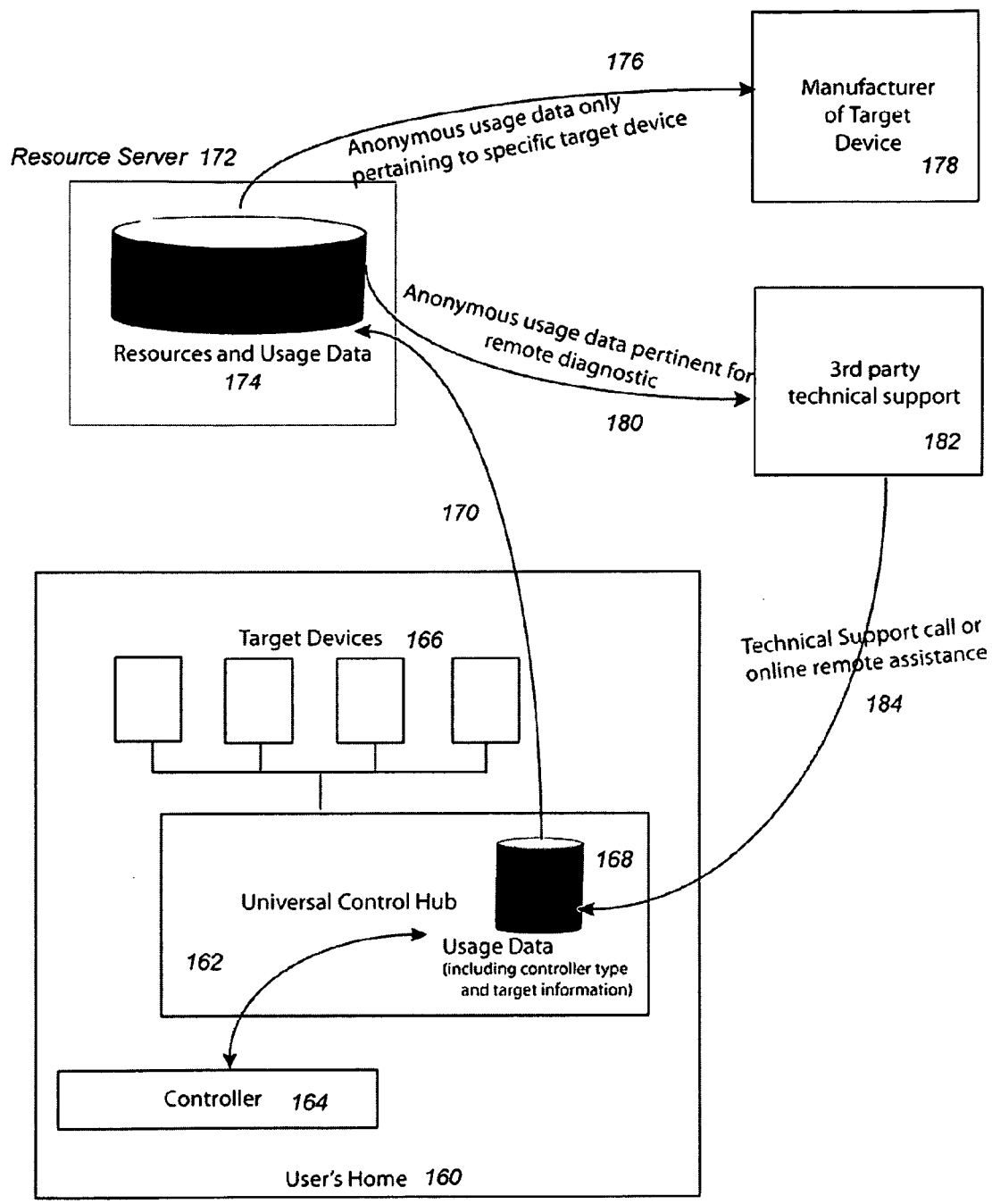
FIG. 6 shows a tracking of usage data in accordance with an embodiment of the invention.

Embodiments of the invention can also provide usage tracking data. FIG. 6 shows a tracking of usage data in accordance with an embodiment of the invention. As shown in FIG. 6, embodiments of the universal control hub 162 can collect data about the user's home 160 using a controller 164 and connected target devices and services 166. This usage data can be stored an updated as a data store 168 at the user's location. The UCH can further communicate 170 this data to the Resource Server 172, if the user agrees to do so.

Using the techniques described above, and the resource server's own resources and usage database 174, the resource server can then, for example, provide anonymous information 176 about a specific target device to an appropriate manufacturer 178. Alternatively, for example, the resource server can provide anonymous usage data 180 to an appropriate third-party technical support entity 182. Each of these features can facilitate the providing of technical support to the end-user 184 and early detection of technical problems. In other examples, replacement parts can be ordered, and repair services can be coordinated, using the functionality of the resource server and usage database.

The present invention may be conveniently implemented using one or more conventional general purpose or specialized digital computer, computing device, machine, or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for allowing device control and access to digital content through pluggable user interfaces, comprising:

a hub which enables communication with a plurality of target devices and services;

a resource server, which executes on one or more computers and which includes a resource and usage database which stores information about resources that are associated with the target devices and services, including mandatory and optional properties and access rights, for the purpose of allowing control of the target devices and services via the hub, and one or more pluggable user interfaces which enable access to the target devices and services;

wherein, for each particular user using the system, the resource server matches that particular user with a pluggable user interface that the particular user can then use as their personal interface to access and control the target devices and services;

a front-end that enables users to control and access the plurality of target devices using their pluggable user interface; and wherein the hub is a Universal Control Hub and the system is further configured to provide the front-end to the Universal Control Hub as an online service.

2. The system of claim 1, wherein the system is further configured to provide access rights for resources including at least one of read, write, query and retrieval flags for owners, groups, others; and user types and their meaning as query restricted, user restricted, group restricted, not restricted, or admin.

3. The system of claim 1, wherein the system is further configured to provide determination of mandatory and optional properties of resources based on a Multipurpose Internet Mail Extensions (MIME) type.

4. The system of claim 1, wherein the system is further configured to provide ranking of resources based on weights given in a resource query or weights intrinsically determined by the resource server.

5. The system of claim 1, wherein the system is further configured to provide registering a pluggable user interface upon upload resulting in a unique resource name.

6. The system of claim 1, further comprising user interface socket descriptions for device classes.

7. The system of claim 1, wherein the system is further configured to provide keeping protected media over High-Definition Multimedia Interface (HDMI) separated from the control network.

8. The system of claim 1, wherein the system is further configured to provide using the Resource Server to track usage data and dynamically adjust the pluggable user interface without the need for user intervention.

9. The system of claim 1, wherein the system is further configured to provide technical support of consumer electronics equipment facilitated by usage parameters known by the universal control hub.

10. A method for allowing device control and access to digital content through pluggable user interfaces, comprising the steps of:
    providing a hub which enables communication with a plurality of target devices and services;
    providing a resource server, which executes on one or more computers and which includes
    a resource and usage database which stores information about resources that are associated with the target devices and services, including mandatory and optional properties and access rights, for the purpose of allowing control of the target devices and services via the hub, and
    one or more pluggable user interfaces which enable access to the target devices and services;
    for each particular user using the system, matching that particular user with a pluggable user interface that the particular user can then use as their personal interface to access and control the target devices and services;
    providing at the resource server a front-end that enables users to control and access the plurality of target devices using their pluggable user interface; and
    wherein the hub is a Universal Control Hub and the system is further configured to provide the front-end to the Universal Control Hub as an online service.

11. The method of claim 10, further comprising providing access rights for resources including at least one of read, write, query and retrieval flags for owners, groups, others; and user types and their meaning as query restricted, user restricted, group restricted, not restricted, admin.

12. The method of claim 10, further comprising providing determination of mandatory and optional properties of resources based on a Multipurpose Internet Mail Extensions (MIME) type.

13. The method of claim 10, further comprising ranking of resources based on weights given in a resource query or weights intrinsically determined by the resource server.

14. The method of claim 10, further comprising registering a pluggable user interface upon upload resulting in a unique resource name.

15. The method of claim 10, further comprising using user interface socket descriptions for device classes.

16. The method of claim 10, further comprising keeping protected media over High-Definition Multimedia Interface (HDMI) separated from the control network.

17. The method of claim 10, further comprising using the Resource Server to track usage data and dynamically adjust the pluggable user interface without the need for user intervention.

18. The method of claim 10, further comprising providing technical support of consumer electronics equipment facilitated by usage parameters known by the universal control hub.

* * * * *